US012578620B2

(12) United States Patent
Wu et al.

(10) Patent No.: US 12,578,620 B2
(45) Date of Patent: Mar. 17, 2026

(54) OPTICAL ELEMENT DRIVING MECHANISM

(71) Applicant: TDK TAIWAN CORP., Taoyuan City (TW)

(72) Inventors: Ya-Hsiu Wu, Taoyuan City (TW); Yi-Ho Chen, Taoyuan City (TW); Ying-Jen Wang, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 392 days.

(21) Appl. No.: 18/089,034

(22) Filed: Dec. 27, 2022

(65) Prior Publication Data

US 2023/0204973 A1     Jun. 29, 2023

Related U.S. Application Data

(60) Provisional application No. 63/266,034, filed on Dec. 27, 2021.

(51) Int. Cl.

| | |
|---|---|
| *G02B 7/04* | (2021.01) |
| *B08B 7/02* | (2006.01) |
| *B60R 11/00* | (2006.01) |
| *B60R 11/04* | (2006.01) |
| *B60S 1/60* | (2006.01) |
| *G02B 7/08* | (2021.01) |
| *G02B 26/08* | (2006.01) |
| *G02B 27/00* | (2006.01) |
| *G02B 27/64* | (2006.01) |
| *G03B 3/10* | (2021.01) |
| *G03B 5/00* | (2021.01) |
| *G03B 5/06* | (2021.01) |

(Continued)

(52) U.S. Cl.
CPC ................. *G03B 5/00* (2013.01); *G02B 7/08* (2013.01); *G02B 26/08* (2013.01); *G02B 27/0006* (2013.01); *G02B 27/646* (2013.01); *H04N 23/55* (2023.01); *H04N 23/6812* (2023.01); *H04N 23/687* (2023.01); *G03B 2205/0015* (2013.01); *G03B 2205/0069* (2013.01); *H02K 41/0354* (2013.01); *H04N 23/51* (2023.01)

(58) Field of Classification Search
CPC ............................ G02B 26/0833; G02B 26/85
USPC ..................... 359/196.1, 199.2, 200.7, 213.1
See application file for complete search history.

(56) References Cited

U.S. PATENT DOCUMENTS

| | | | | |
|---|---|---|---|---|
| 355,084 A | * | 12/1886 | Houston .............. | G03B 17/045 |
| | | | | 396/538 |
| 5,469,289 A | * | 11/1995 | Iwao .................... | G02B 26/121 |
| | | | | 359/200.1 |

(Continued)

FOREIGN PATENT DOCUMENTS

CN          215642016 U      1/2022

OTHER PUBLICATIONS

Chinese Office Action cited in counterpart Chinese Application No. 202223501133.6 issued on May 11, 2023, 1 page.

*Primary Examiner* — Ricky L Mack
*Assistant Examiner* — Elizabeth M Hall
(74) *Attorney, Agent, or Firm* — MUNCY, GEISSLER, OLDS & LOWE, P.C.

(57) ABSTRACT

An optical element driving mechanism used for driving a first optical element is provided. The optical element driving mechanism includes a fixed portion and a first driving assembly. The first driving assembly is used for driving the first optical element to move relative to the fixed portion in a first dimension.

18 Claims, 9 Drawing Sheets

(51) Int. Cl.

| | |
|---|---|
| *G03B 30/00* | (2021.01) |
| *H04N 23/00* | (2023.01) |
| *H04N 23/54* | (2023.01) |
| *H04N 23/55* | (2023.01) |
| *H04N 23/68* | (2023.01) |
| *H02K 41/035* | (2006.01) |
| *H04N 23/51* | (2023.01) |

(56)　　　　　References Cited

U.S. PATENT DOCUMENTS

| | | | | |
|---|---|---|---|---|
| 6,995,499 B2 * | 2/2006 | Hwang | .............. | G02B 26/0858 |
| | | | | 359/224.1 |
| 7,442,918 B2 * | 10/2008 | Sprague | .............. | G02B 26/085 |
| | | | | 359/872 |
| 8,416,484 B2 * | 4/2013 | Kanno | .............. | G02B 26/0841 |
| | | | | 359/224.1 |
| 8,830,551 B2 * | 9/2014 | Kitazawa | .............. | H02N 1/006 |
| | | | | 359/224.1 |
| 9,983,401 B2 * | 5/2018 | Abele | .................. | G02B 26/105 |
| 2006/0082250 A1 * | 4/2006 | Ko | ......................... | H02N 1/008 |
| | | | | 310/309 |
| 2007/0273946 A1 * | 11/2007 | Kato | .................. | G02B 26/0833 |
| | | | | 359/224.1 |
| 2009/0109512 A1 * | 4/2009 | Park | .................. | G02B 26/0833 |
| | | | | 359/198.1 |
| 2010/0046054 A1 * | 2/2010 | Jeong | .................. | G02B 26/105 |
| | | | | 359/200.7 |
| 2012/0281024 A1 * | 11/2012 | Champion | ........... | H04N 9/3129 |
| | | | | 359/213.1 |
| 2016/0105090 A1 * | 4/2016 | Sadaharu | ............. | G02B 26/101 |
| | | | | 310/38 |
| 2018/0364480 A1 * | 12/2018 | Furuya | .................. | B60K 35/22 |

* cited by examiner

110

111

110

110

135
133
132
140
120
131

134

111

Y
X
Z

OPTICAL ELEMENT DRIVING MECHANISM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism used for driving a first optical element is provided in some embodiments. The optical element driving mechanism includes a fixed portion and a first driving assembly. The first driving assembly is used for driving the first optical element to move relative to the fixed portion in a first dimension.

In some embodiments, the driving assembly comprises a coil having a winding axis, a first magnetic element corresponding to the coil, and a first magnetic permeable element corresponding to the first magnetic element.

In some embodiments, the first magnetic permeable element is plate-shaped. The first magnetic permeable element comprises a first protruding portion protruding from the first magnetic element and corresponding to the coil. The first protruding portion comprises a first protruding surface perpendicular to the winding axis. An N pole and a S pole of the first magnetic element are arranged in a first pole direction.

In some embodiments, the driving assembly further comprises a second magnetic permeable element corresponding to the first magnetic element, and a second magnetic element corresponding to the coil.

In some embodiments, a connection between centers of the first magnetic permeable and the second magnetic permeable element is parallel to the first pole direction. An N pole and a S pole of the second magnetic element are arranged in a second pole direction. The first pole direction and the second pole direction are parallel. Centers of the first magnetic element and the second magnetic element are arranged in a first axis. The first dimension is rotation relative to a first rotational axis. The first rotational axis and the first axis are parallel.

In some embodiments, the optical element driving mechanism further includes a resilient assembly, the optical element is movably connected to the fixed portion through the resilient assembly, and the resilient assembly includes a first fixed end affixed on the optical element, a second fixed end affixed on the fixed portion, an intermediate connecting portion between the first fixed end and the second fixed end, a first resilient portion, wherein the intermediate connecting portion movably connects to the second fixed end through the first resilient portion, a second resilient portion, wherein the first fixed end movably connects to the intermediate connecting portion through the second resilient portion, and a third resilient portion, wherein the intermediate connecting portion movably connects to the second fixed end through the third resilient portion.

In some embodiments, the resilient assembly is plate-shaped. The first resilient portion and the second resilient portion have different elastic coefficients. A minimum width of the first resilient portion is less than a minimum width of the second resilient portion. The first resilient portion and the second resilient portion have an identical thickness.

In some embodiments, junctions between the first resilient portion and the second fixed end, between the first resilient portion and the intermediate connecting portion, between the second resilient portion and the intermediate connecting portion, and between the second resilient portion and the first fixed end are arranged along a straight line. The straight line is parallel to the first axis. The first resilient portion and the third resilient portion are arranged along the first axis.

In some embodiments, when viewed in a first direction, the first resilient portion has a plurality of bending structures, the third resilient portion has a plurality of bending structures, and the first resilient portion and the third resilient portion are mirror symmetrical with respect to a second axis. The second axis is perpendicular to the first axis. Number of bends of the second resilient portion is less than number of bends of the first resilient portion.

In some embodiments, the elastic coefficient of the first resilient portion is less than the elastic coefficient of the second resilient portion. The second resilient portion does not have any bending portion. The first axis, the second axis, and the first direction are perpendicular to each other.

In some embodiments, a first surface of the resilient assembly faces the first magnetic element. The first surface and a second surface of the resilient assembly face opposite directions. The first protruding surface is between a center of the resilient element and a center of the coil in the first direction when viewed in a second direction. The first surface faces the coil.

In some embodiments, when current with a first frequency is input to the coil, the first fixed end rotates relative to the fixed portion in a first rotational range, and the intermediate connecting portion rotates relative to the fixed portion in a second rotational range. A maximum of the first rotational range is different from a maximum of the second rotational range.

In some embodiments, when current is input to the coil, a face difference is between movements of the first fixed end and the intermediate connecting portion. The phase difference is greater than 90 degrees.

In some embodiments, the fixed portion includes a bottom surface having a planar structure and facing an external device, a spacing portion between the first magnetic element and the second magnetic element, a first recess used for accommodating a portion of the first magnetic element, a second recess used for accommodating the second magnetic element, a third recess, wherein the first recess is in the third recess. A fourth recess corresponding to the first resilient portion, a fifth recess corresponding to the third resilient portion, and a base surface facing the resilient assembly.

In some embodiments, the maximum of the first rotational range is greater than the maximum of the second rotational range. A first magnetic element surface of the first magnetic element is at least partially exposed from the first recess. At least a portion of the first magnetic permeable element is in the first recess. The second magnetic permeable element is not in the first recess.

In some embodiments, the second recess is in the third recess. The fourth recess is in the third recess. The fifth recess is in the third recess. The spacing portion is in the third recess.

In some embodiments, a shortest distance between the first magnetic element and the bottom surface is different from a shortest distance between the second magnetic element and the bottom surface. A shortest distance between the first magnetic permeable element and the bottom surface is different from a shortest distance between the second magnetic permeable element and the bottom surface.

In some embodiments, the shortest distance between the first magnetic element and the bottom surface is greater than the shortest distance between the second magnetic element and the bottom surface. The shortest distance between the first magnetic permeable element and the bottom surface is greater than the shortest distance between the second magnetic permeable element and the bottom surface.

In some embodiments, the first axis is not parallel to the bottom surface. The first axis is not perpendicular to the bottom surface. The base surface is not parallel to the bottom surface. The base surface is not perpendicular to the bottom surface.

In some embodiments, the third recess is formed on the base surface. The second fixed end is not mirror symmetric relative to the first axis when viewed in the first direction. A distance between a center of the second fixed end and a center of the optical element is greater than 0 when viewed in the first direction. A shortest distance between the center of the second fixed end and the bottom surface is different from a shortest distance between the center of the optical element and the bottom surface. The second fixed portion is U-shaped.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
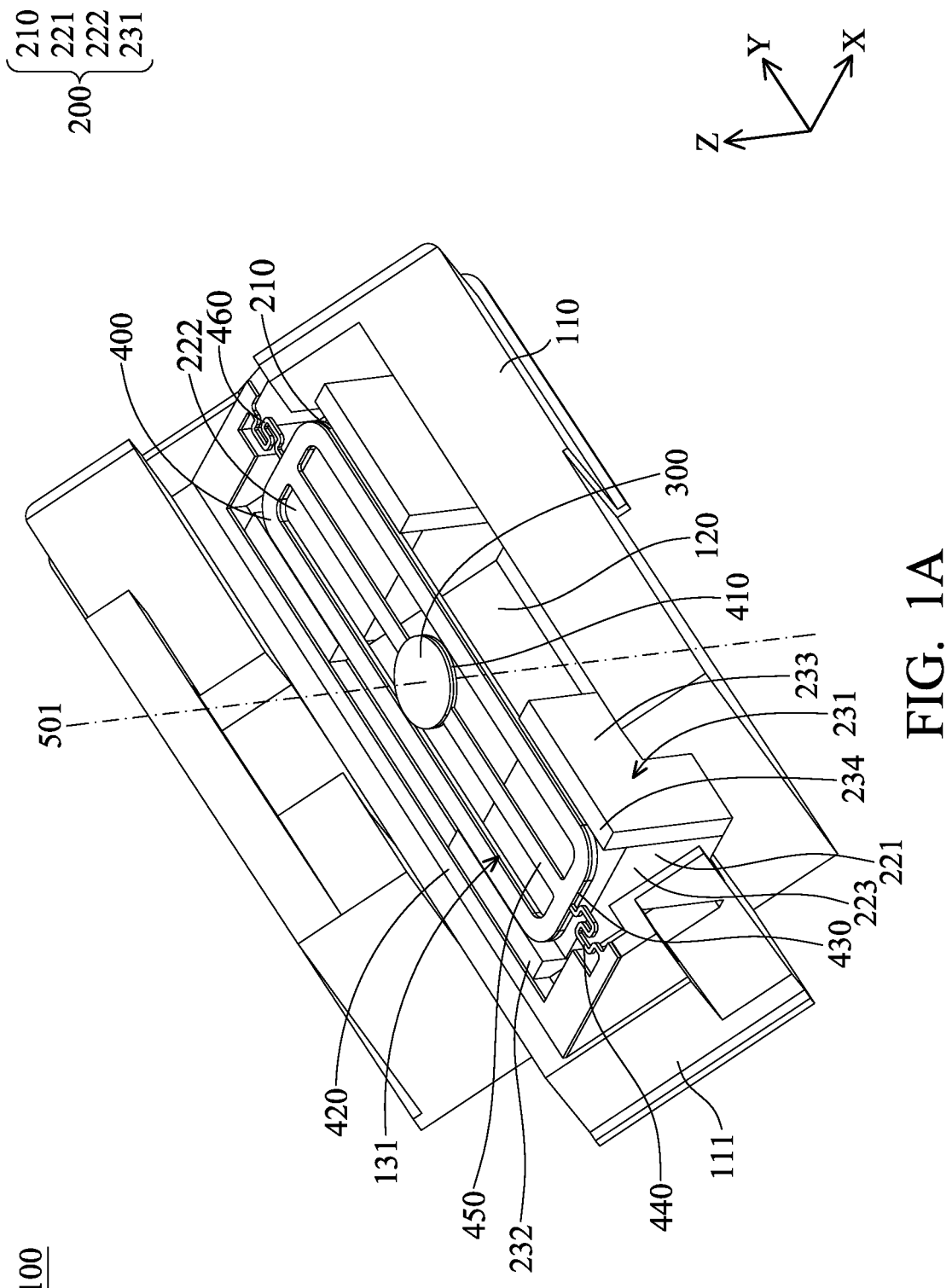
FIG. 1A, FIG. 1B, FIG. 1C, and FIG. 1D are schematic views of an optical element driving mechanism viewed from different directions in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless expressly defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
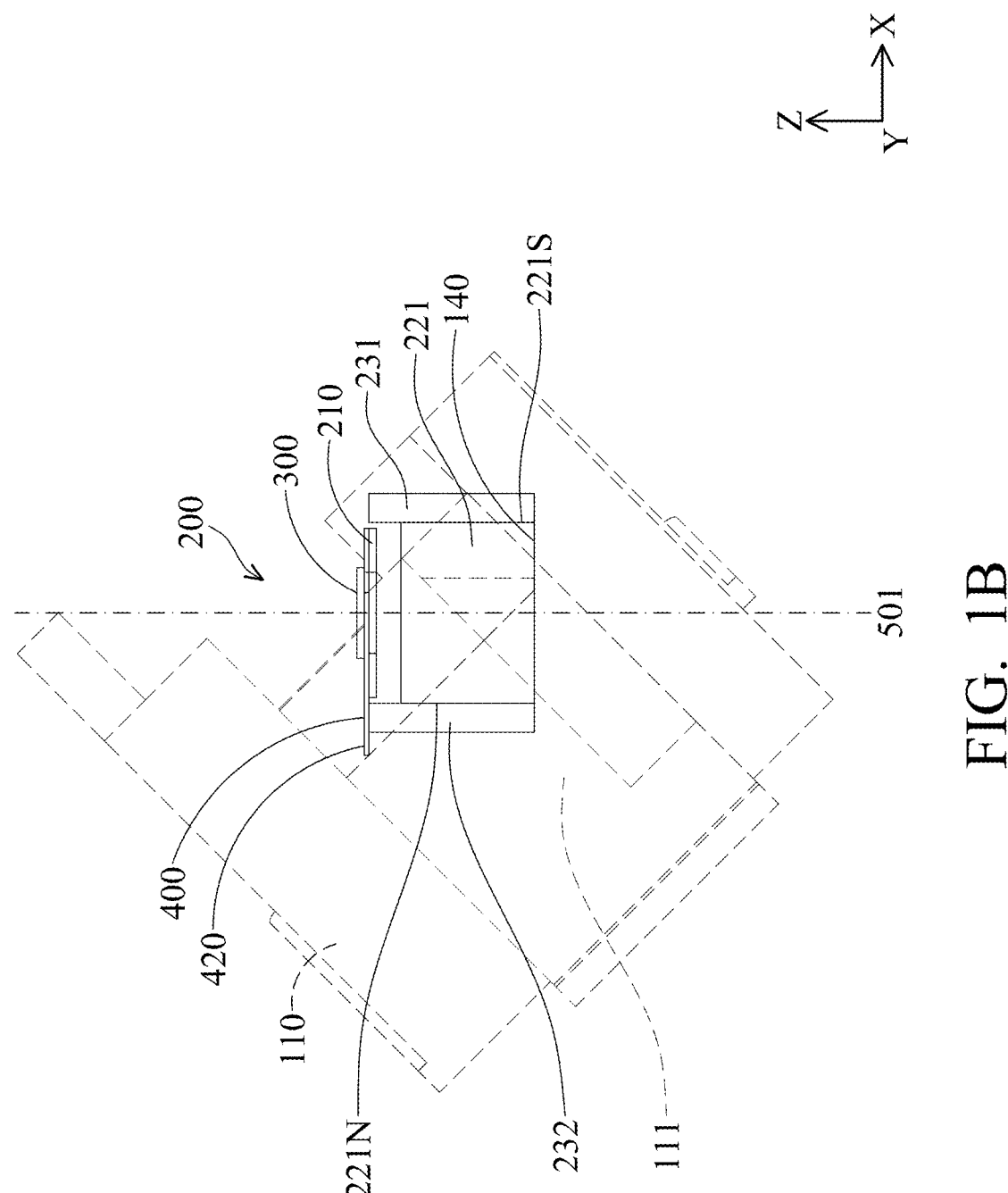
Figure 1C:
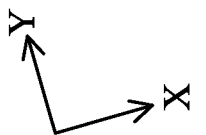
Figure 1C:
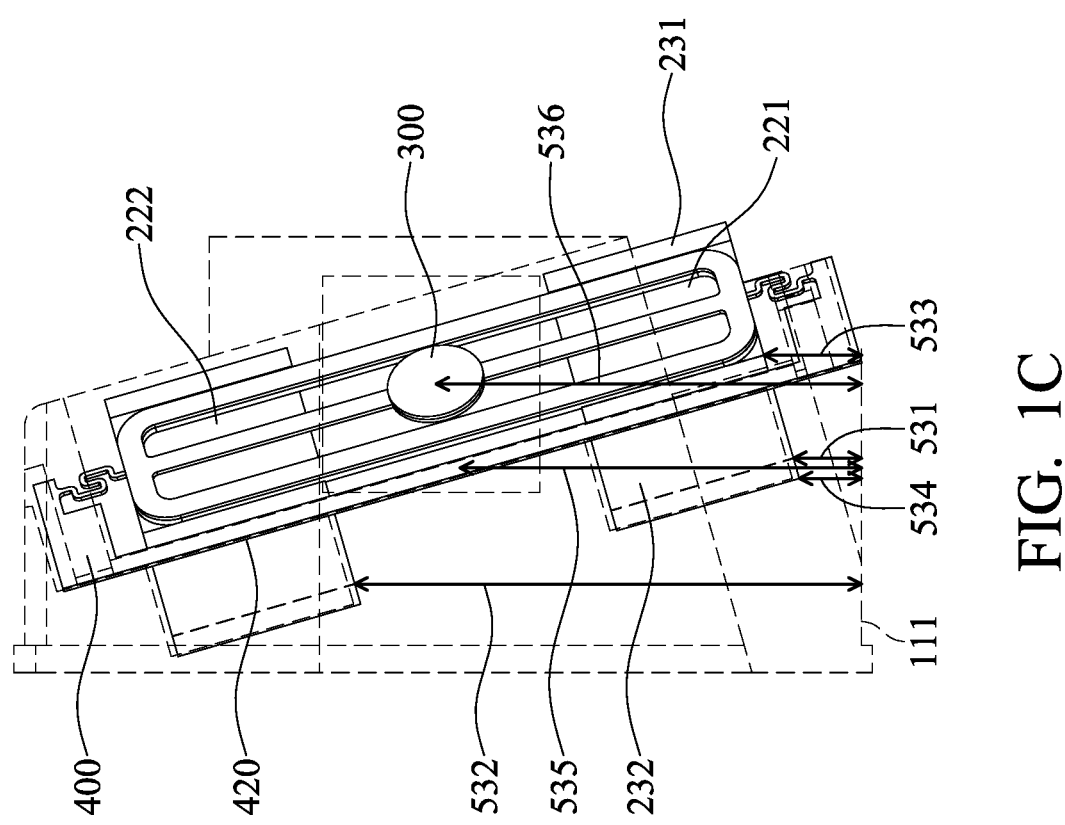
Figure 1D:
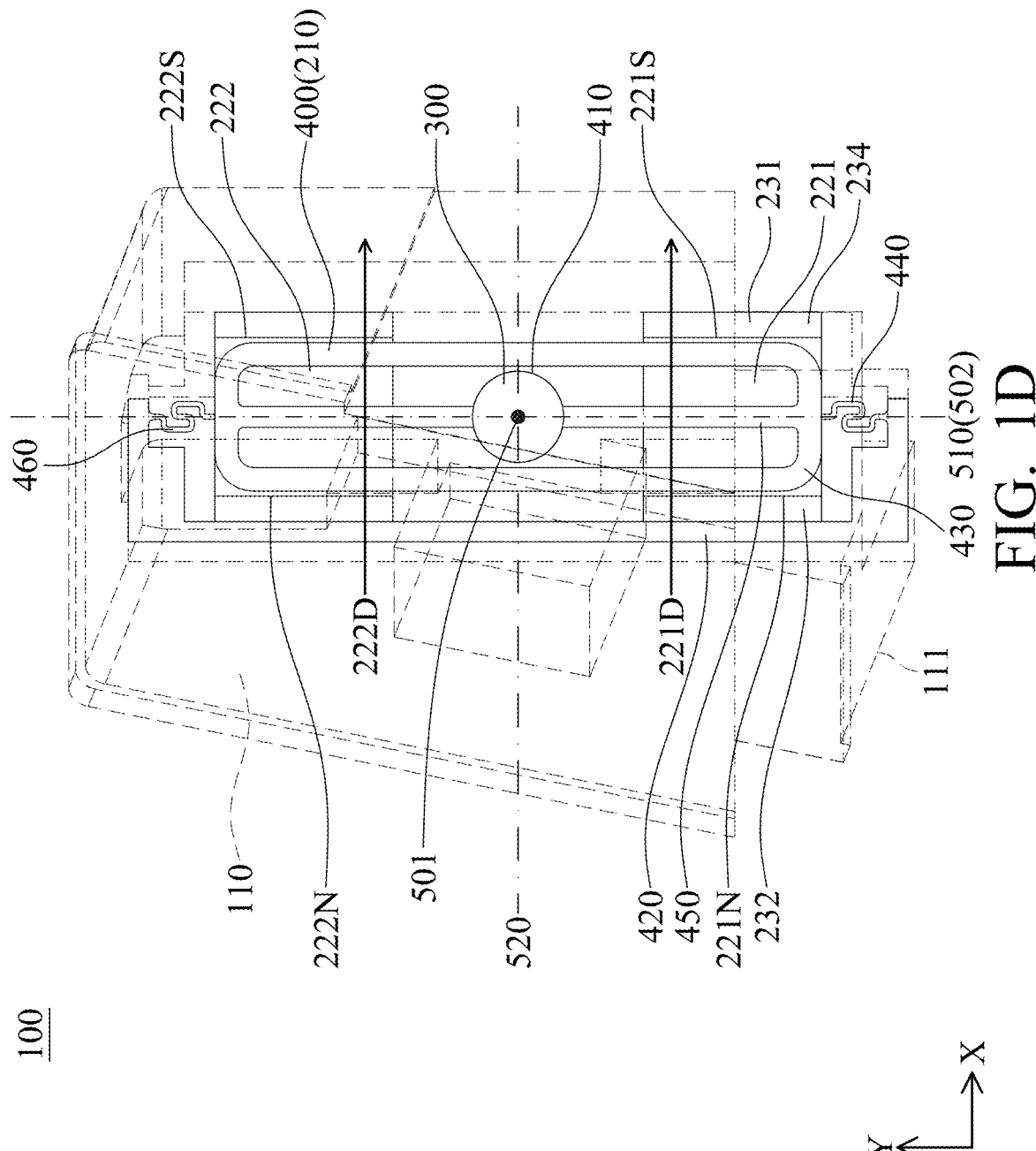

FIG. 1A, FIG. 1B, FIG. 1C, and FIG. 1D are schematic views of an optical element driving mechanism 100 viewed from different directions in some embodiments of the present disclosure. The fixed portion 110 in FIG. 1B to FIG. 1D is shown by dashed line to further show position relationship between other elements. As shown in FIG. 1A to FIG. 1D, the optical element driving mechanism 100 may include a fixed portion 110, a driving assembly 200, and a resilient assembly 400, and the optical element driving mechanism 100 is used for driving a optical element 300. For example, the driving assembly 200 may be disposed on the fixed portion 110 and used for driving the optical element 300 to move relative to the fixed portion 110. The fixed portion 110 may movably connect to the optical element 300 through the resilient assembly 400

In some embodiments, the optical element 300 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g., infrared or ultraviolet) are also included in the present disclosure. Therefore, the type and function of the optical element 300 may be different, and suitable optical element 300 may be chosen based on actual requirement.

In some embodiments, the driving assembly 200 may include a coil 210, a first magnetic element 221, a second magnetic element 222, a first magnetic permeable element 231, and a second magnetic permeable element 232. The coil 210 may include a winding axis 501, and the winding axis 501 may extend along a first direction (e.g., the Z direction) and pass through the coil 210, which means the circuit in the coil 210 may surround the winding axis 501.

In some embodiments, the first magnetic element 221 and the second magnetic element 222 may correspond to the coil 210 and may be, for example, magnets. Therefore, the first magnetic element 221 and the second magnetic element 222 may generate an electromagnetic force with the magnetic field generated when current is applied to the coil 210. The electromagnetic force may move the optical element 300 relative to the fixed portion 110. In some embodiments, the N pole 221N and the S pole 221S of the first magnetic element 221 may arrange in a first pole direction 221D (e.g., the X direction), the N pole 222N and the S pole 222S of the second magnetic element 222 may arrange in a second pole direction 222D (e.g., the X direction), and the first pole direction 221D and the second pole direction 222D may be parallel. In some embodiments, centers of the first magnetic element 221 and the second magnetic element 222 may arrange along a first axis 510, and the first axis 510 may extend in, for example, the Y direction.

In some embodiments, the first magnetic permeable element 231 and the second magnetic permeable element 232 may be plate-shaped, and the first magnetic permeable element 231 may include a first protruding portion 233 protruding from the first magnetic element 221 and corresponding to the coil 210. In some embodiments, the first magnetic permeable element 231 and the second magnetic permeable element 232 may be made by magnetic material, so the first magnetic permeable element 231 and the second magnetic permeable element 232 may be used for guiding magnetic field, such as changing the strength and direction of the magnetic field of the first magnetic element 221 and the second magnetic element 222. As a result, the movement and accuracy of the optical element 300 may be controlled.

The first protruding portion 233 may include a first protruding surface 234 perpendicular to the winding axis 501. In some embodiments, the first magnetic permeable element 231 and the second magnetic permeable element 232 may be disposed on opposite sides of the first magnetic element 221 and include metal used for adjusting the magnetic field of the first magnetic element 221. In some embodiments, the first magnetic permeable element 231 and the second magnetic permeable element 232 may arrange in the X direction, which means a connection between centers of the first magnetic permeable element 231 and the second magnetic permeable element 232 may be parallel to the first pole direction.

In some embodiments, the coil 210 may be disposed on the resilient assembly 400, and the resilient assembly 400 may be plate-shaped and may include a first fixed end 410, a second fixed end 420, a intermediate connecting portion 430, a first resilient portion 440, a second resilient portion 450, and a third resilient portion 460.

In some embodiments, the first fixed end 410 may affixed on the optical element 300, and the second fixed end 420 may be affixed on the fixed portion 110 and may be U-shaped. The intermediate connecting portion 430 may be between the first fixed end 410 and the second fixed end 420, movably connect to the first fixed end 410 through the second resilient portion 450, and movably connect to the second fixed end 420 through the first resilient portion 440 and the third resilient portion 460. Therefore, the optical element 300 may movably connect to the fixed portion 110 through the resilient assembly 400, so the driving assembly 200 may drive the optical element 300 to move relative to the fixed portion 110 in a first dimension, such as rotation taking a first rotational axis 502 as the rotational axis. In some embodiments, the first rotational axis 502 may extend in the Y direction and pass through the first resilient portion 440 and the third resilient portion 460. In some embodiments, the first rotational axis 502 may be parallel to the first axis 510, so the first resilient portion 440 and the third resilient portion 460 may arrange along the first axis 510.

In some embodiments, the second axis 520 may pass through the center of the optical element 300 and may be perpendicular to the first axis 510 and the first direction (the Z direction), and the first axis 510 is also perpendicular to the first direction (the Z direction). In other words, the first axis 510, the second axis 520, and the first direction (the Z direction) are perpendicular with each other. The first resilient portion 440 and the third resilient portion 460 may have multiple bending structures to provide flexible support and may withstand more loading, such as the loading may be spread evenly. Furthermore, the first resilient portion 440 and the third resilient portion 460 may be mirror symmetric relative to the second axis 520. However, the number of bends of the second resilient portion 450 may be less than the number of bends of the first resilient portion 440 or the third resilient portion 460, such as the second resilient portion 450 may have no bent portion.

It should be noted that the junctions between the first resilient portion 440 and the second fixed end 420, between the first resilient portion 440 and the intermediate connecting portion 430, between the second resilient portion 450 and the intermediate connecting portion 430, and between the second resilient portion 450 and the first fixed end 410 are arranged along a straight line, such as may arrange in a straight line parallel to the first axis 510, as shown in FIG. 1D. Moreover, when viewed along the first direction (the Z direction), the second fixed end 420 is not symmetric relative to the first axis 510, and is symmetric relative to the second axis 520. In some embodiments, a distance greater than zero may be between the center of the second fixed end 420 and the center of the optical element 300, which means the center of the second fixed end 420 and the center of the optical element 300 do not overlap with each other.

Figure 1E:
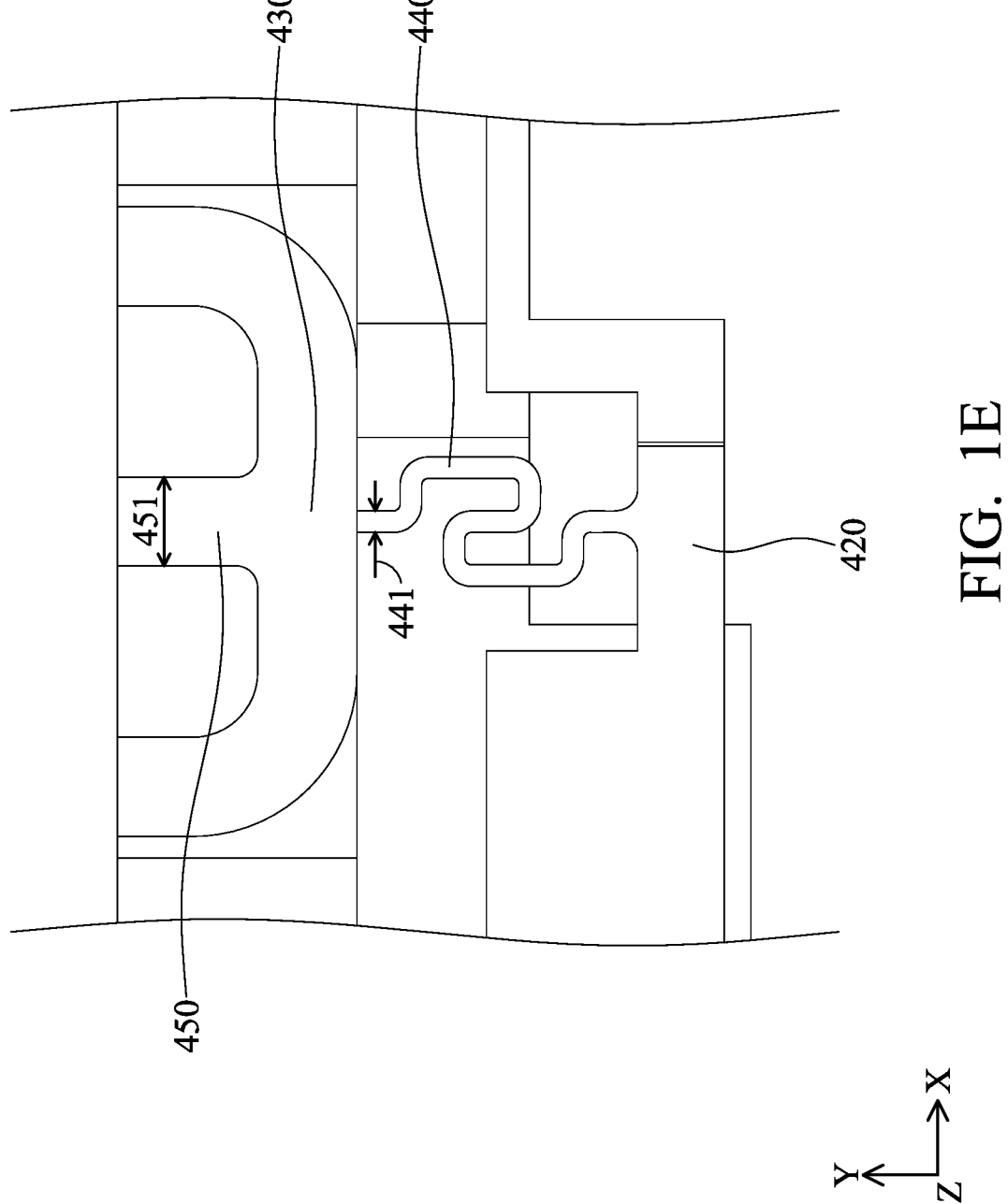
FIG. 1E is an enlarged view of FIG. 1D.

FIG. 1E is an enlarged view of FIG. 1D. As shown in FIG. 1E, the first resilient portion 440 may have a minimum width 441, the second resilient portion 450 may have a minimum width 451, and the minimum width 441 may be less than the minimum width 451. In other words, in some embodiments, the elastic coefficient of the first resilient portion 440 and the elastic coefficient of the second resilient portion 450 are different, such as the elastic coefficient of the first resilient portion 440 may be less than the elastic coefficient of the second resilient portion 450. However, in some embodiments, the thickness of the first resilient portion 440 may be identical to the thickness of the second resilient portion 450, such have an identical thickness in the Z direction.

In some embodiments, the optical element 300 may be driven by resonance. Resonance means that when a system vibrates, it responds more strongly to stimuli at specific frequencies. For example, when current with a first frequency is input to the coil 210, the first fixed end 410 and the optical element 300 may rotate relative to the fixed portion 110 in a first rotational range, and the intermediate connecting portion 430 may rotate relative to the fixed portion 110 in a second rotational range, such as taking the first rotational axis 502 as the rotational axis. This method can improve the motion accuracy and reliability of the optical element 300, and can effectively control the position and direction of the optical element 300.

It should be noted that the maximum value of the first rotation range (such as the maximum rotation angle) is different from the maximum value of the second rotation range, for example, the maximum value of the first rotation range may be greater than the maximum value of the second rotation range. In this way, the first rotation range of the first fixed end 410 and the optical element 300 can be enlarged through resonance without rotating the intermediate connecting portion 430 at a large angle. In this way, the traveling direction of the light incident on the optical element 300 may be changed, which is suitable for functions such as detection, scanning, and projection.

In some embodiments, when the current is input to the coil 210, the movement of the first fixed end 410 and the intermediate connecting portion 430 may have a phase difference. The phase difference refers to the positional relationship between two signals in time, and the phase difference can be greater than 90 degrees. That is, they differ in time by more than a quarter of a period. In this case, the movement of the first fixed end 410 and the intermediate connecting portion 430 will be different.

Figure 2:
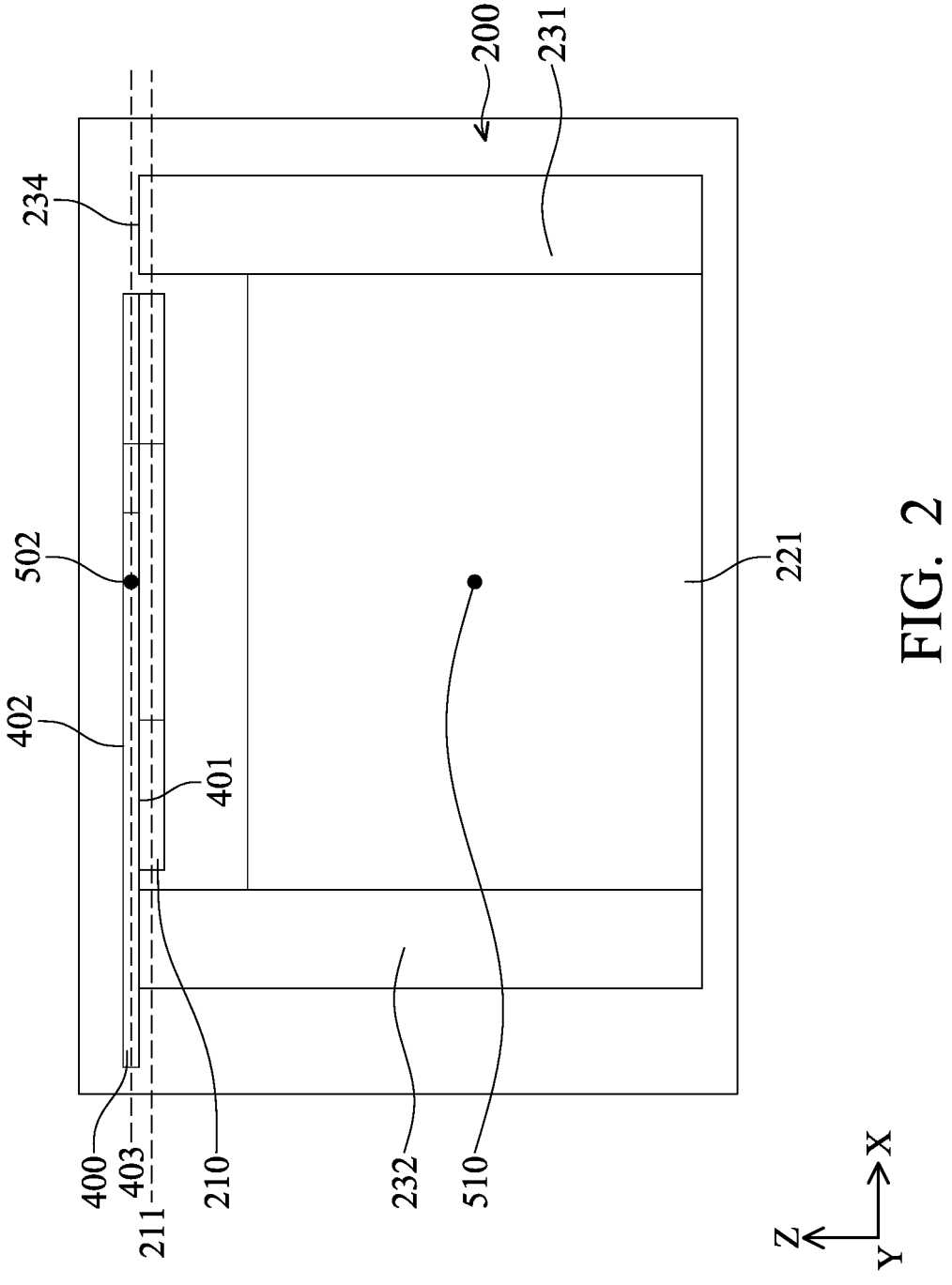
FIG. 2 is a schematic view of some elements of the optical element driving mechanism.

FIG. 2 is a schematic view of some elements of the optical element driving mechanism 100, in which the driving assembly 200 and the resilient assembly 400 are mainly shown. As shown in FIG. 2, the resilient assembly 400 may have a first surface 401 and a second surface 402 facing in opposite directions. In some embodiments, the first surface 401 may face the coil 210 and the first magnetic element 221, while the second surface 402 may face away from the coil 210 and the first magnetic element 221. When viewed along the second direction (for example, the Y direction), the first protruding surface 234 may be located between the second surface 402 and the first magnetic element 221 in the Z direction.

In some embodiments, a plane 211 may pass through the center of the coil 210, and a plane 403 may pass through the center of the resilient assembly 400, and the plane 211 and the plane 403 may be perpendicular to the Z direction. In the Z direction, the first protruding surface 234 may be located between the plane 211 and the plane 403. Thereby, the magnetic field of the first magnetic element 221 may be concentrated in a region by using the tips of the first magnetic permeable element 231 and the second magnetic permeable element 232 (at the first protruding surface 234), and the strength of the magnetic field may be increased. In this way, the first magnetic element 221 may receive a stronger force to improve the driving efficiency.

Figure 3A:
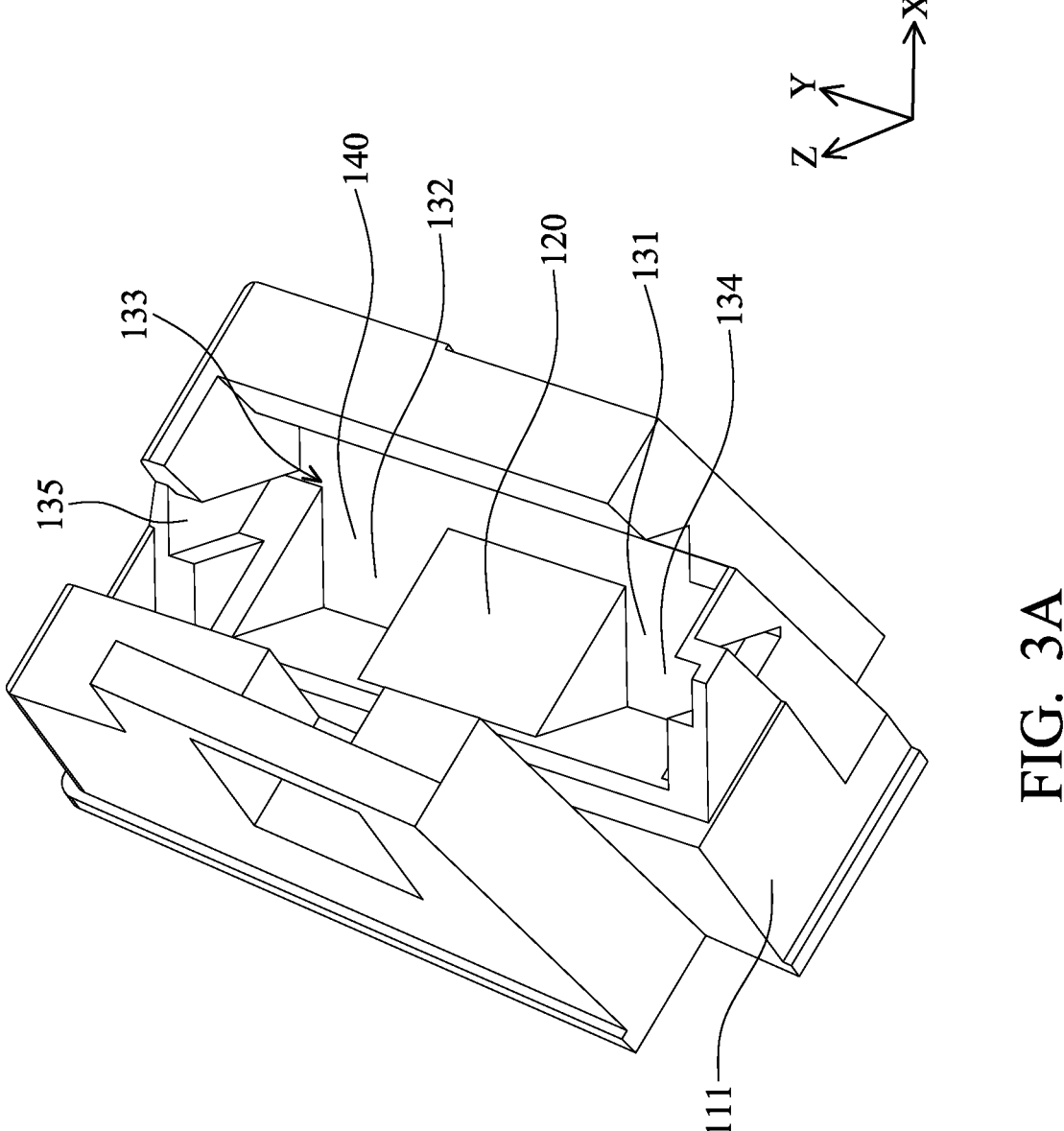
FIG. 3A, FIG. 3B, and FIG. 3C are schematic views of the fixed portion viewed from different directions.
Figure 3B:
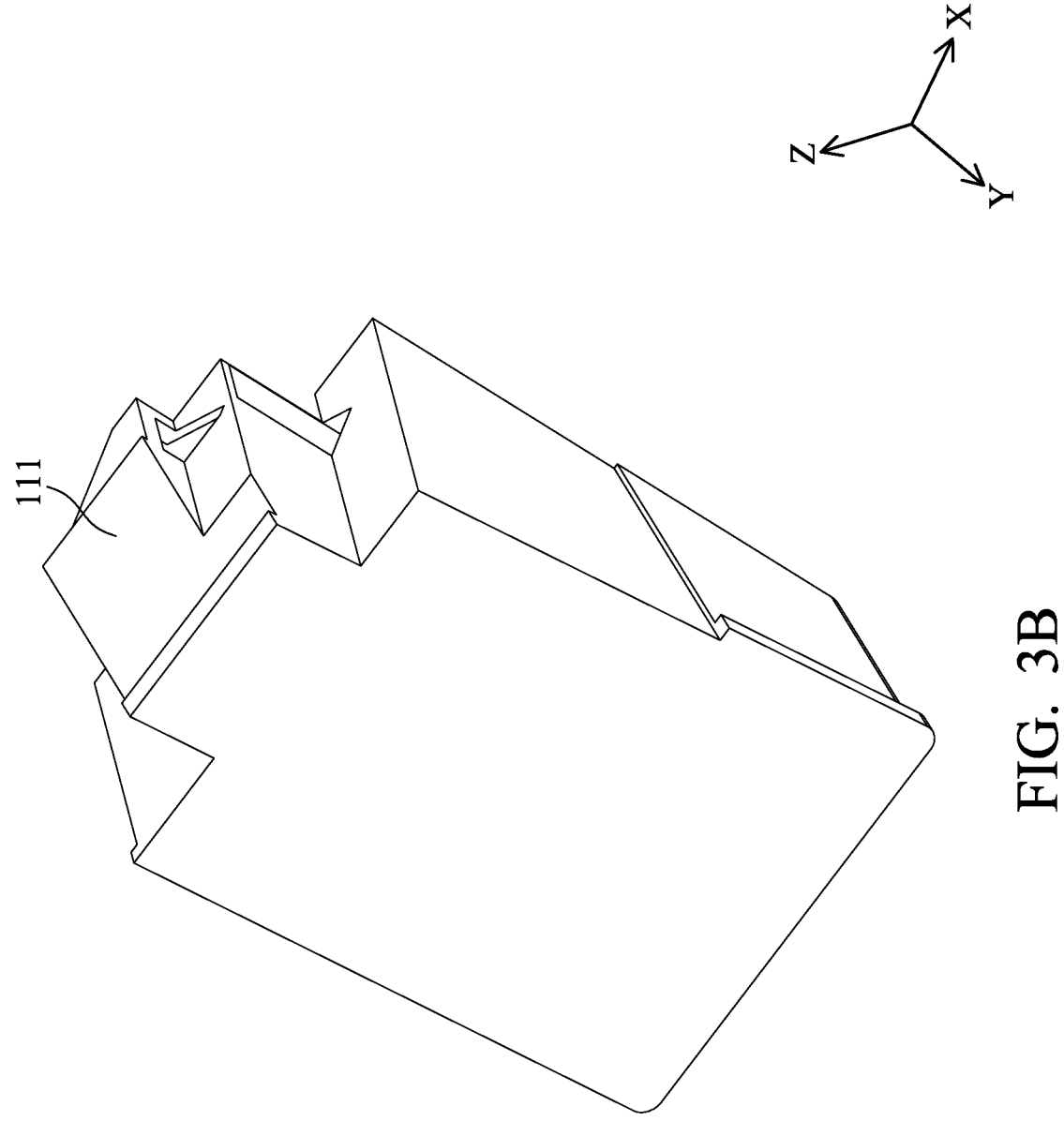
Figure 3C:
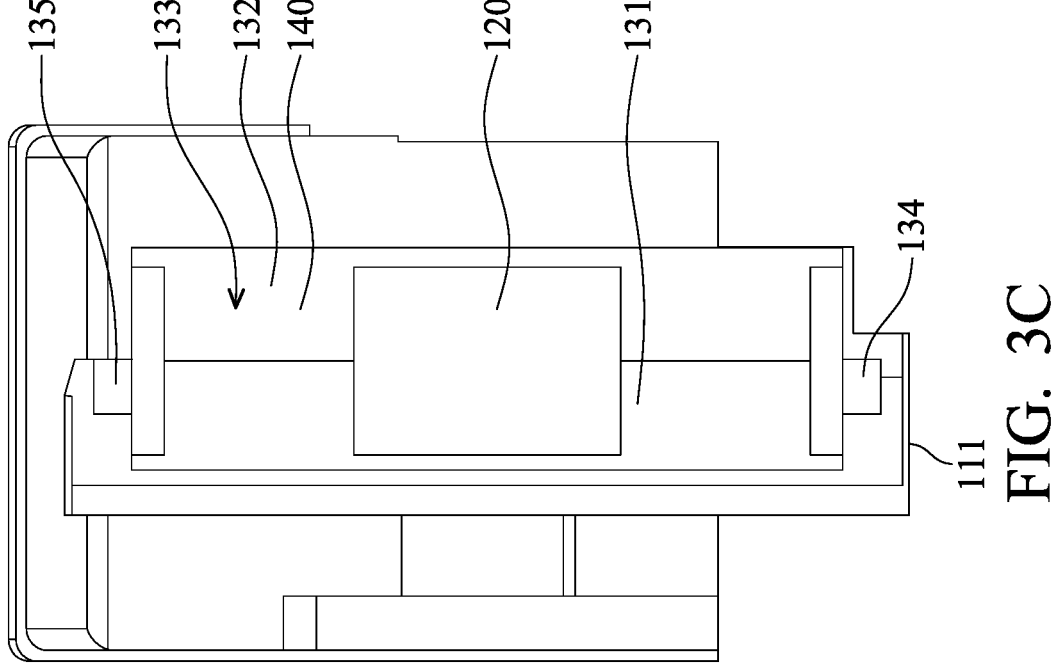

FIG. 3A, FIG. 3B, and FIG. 3C are schematic views of the fixed portion 110 viewed from different directions. As shown in FIG. 3A to FIG. 3C, the fixed portion 110 may include a bottom surface 111, which has a planar structure and faces an external device (not shown, such as a mobile phone substrate, a casing of a portable device, production equipment, etc.). In addition, the fixed portion 110 may further include a spacing portion 120 and a third recess 133, and the third recess 133 may include a first recess 131, a second recess 132, a fourth recess 134, and a fifth recess 135. That is, the first recess 131, the second recess 132, the fourth recess 134, and the fifth recess 135 may be located in the third recess 133, and the spacing portion 120 can also be located in the third recess 133. In some embodiments, the fixed portion 110 may further have a base surface 140 facing the first magnetic element 221 and the resilient assembly 400. The third recess 133 may be formed on the base surface 140.

In some embodiments, the spacing portion 120 may be located between the first magnetic element 221 and the second magnetic element 222 to separate the first magnetic element 221 and the second magnetic element 222 to avoid magnetic interference. Magnetic interference refers to the magnetic field that affects each other when the first magnetic element 221 and the second magnetic element 222 are close together, which may degrade the performance of the first magnetic element 221 and the second magnetic element 222 and may cause unstable movement. Therefore, the spacing portion 120 is used to separate the first magnetic element 221 and the second magnetic element 222 to improve the performance of the optical element driving mechanism 100.

The first recess 131 may be used to accommodate a portion of the first magnetic element 221, and the second recess 132 may be used to accommodate the second magnetic element 222, that is to say, the spacing portion 120 can be located between the first recess 131 and the second recess 132, the first magnetic element 221 is at least partially located in the first recess 131, and the t second magnetic element 222 is not located in the first recess 131.

In some embodiments, the first magnetic element 221 may include a first magnetic element surface 223, and the first magnetic element surface 223 may be at least partially exposed from the first recess 131. In some embodiments, the fourth recess 134 may correspond to the first resilient portion 440, and the fifth recess 135 may correspond to the third resilient portion 460, for example, may at least partially overlap in the Z direction with each other to accommodate and protect the first resilient portion 440 and the third resilient portion 460, and achieve miniaturization.

In some embodiments, as shown in FIG. 1C, a minimum distance 531 between the first magnetic element 221 and the bottom surface 111 is different from a minimum distance 532 between the second magnetic element 222 and the bottom surface 111. For example, the minimum distance 531 may be less than the minimum distance 532. In addition, a minimum distance 533 between the first magnetic permeable element 231 and the bottom surface 111 may be different from a minimum distance 534 between the second magnetic permeable element 232 and the bottom surface 111. For example, the minimum distance 533 may be greater than the minimum distance 534. In some embodiments, a minimum distance 535 between the center of the second fixed end 420 and the bottom surface 111 may be different from a minimum distance 536 between the center of the optical element 300 and the bottom surface 111. For example, the minimum distance 535 may be smaller than the minimum distance 536. In some embodiments, the bottom surface 111 and the base surface 140 are neither parallel nor perpendicular to each other, and the first axis 510 and the bottom surface 111 are neither parallel nor perpendicular to each other.

In some embodiments, the optical element driving mechanism 100 can also be matched with other optical element driving mechanisms to deflect light paths in multiple dimensions, thereby achieving functions such as detection, scanning, and projection.

In summary, an optical element driving mechanism is provided and used for driving a first optical element. The optical element driving mechanism includes a fixed portion and a first driving assembly. The first driving assembly is used for driving the first optical element to move relative to the fixed portion in a first dimension. Therefore, functions like detection, scanning, and projection may be achieved, and miniaturization may be achieved as well.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism used for driving an optical element, comprising:
   a fixed portion;
   a first driving assembly used for driving the optical element moving relative to the fixed portion in a first dimension; and
   a resilient assembly comprising:
      a first resilient portion;
      a second resilient portion;
      a third resilient portion;
      a first fixed end affixed on the optical element;
      a second fixed end affixed on the fixed portion; and
      an intermediate connecting portion between the first fixed end and the second fixed end, wherein the optical element is movably connected to the fixed portion through the resilient assembly,
   wherein:
      when viewed in a first direction, the first resilient portion has a plurality of bends, the third resilient portion has a plurality of bends, and the first resilient portion and the third resilient portion are mirror symmetrical with respect to a second axis;
      a number of bends of the second resilient portion is less than a number of bends of the first resilient portion;
      junctions between the first resilient portion and the second fixed end, between the first resilient portion and the intermediate connecting portion, between the second resilient portion and the intermediate connecting portion, and between the second resilient portion and the first fixed end are arranged along a straight line;
      the straight line is parallel to a first axis; and
      the first resilient portion and the third resilient portion are arranged along the first axis.

2. The optical element driving mechanism as claimed in claim 1, wherein the first driving assembly comprises:
   a coil having a winding axis;
   a first magnetic element corresponding to the coil; and
   a first magnetic permeable element corresponding to the first magnetic element.

3. The optical element driving mechanism as claimed in claim 2, wherein:
   the first magnetic permeable element comprises a first protruding portion protruding from the first magnetic element and corresponding to the coil;
   the first protruding portion comprises a first protruding surface perpendicular to the winding axis; and
   an N pole and a S pole of the first magnetic element are arranged in a first pole direction.

4. The optical element driving mechanism as claimed in claim 3, wherein the first driving assembly further comprises:
   a second magnetic permeable element corresponding to the first magnetic element; and
   a second magnetic element corresponding to the coil.

5. The optical element driving mechanism as claimed in claim 4, wherein:
   a connection between centers of the first magnetic permeable element and the second magnetic permeable element is parallel to the first pole direction;
   an N pole and a S pole of the second magnetic element are arranged in a second pole direction;
   the first pole direction and the second pole direction are parallel;
   centers of the first magnetic element and the second magnetic element are arranged in the first axis;
   the first dimension is rotation relative to a first rotational axis;
   the first rotational axis and the first axis are parallel; and
   the second axis is perpendicular to the first axis.

6. The optical element driving mechanism as claimed in claim 5, wherein:
   the intermediate connecting portion movably connects to the second fixed end through the first resilient portion;
   the first fixed end movably connects to the intermediate connecting portion through the second resilient portion; and
   the intermediate connecting portion movably connects to the second fixed end through the third resilient portion.

7. The optical element driving mechanism as claimed in claim 6, wherein:
the first resilient portion and the second resilient portion have different elastic coefficients;
a minimum width of the first resilient portion is less than a minimum width of the second resilient portion; and
the first resilient portion and the second resilient portion have an identical thickness.
8. The optical element driving mechanism as claimed in claim 7, wherein:
the elastic coefficient of the first resilient portion is less than the elastic coefficient of the second resilient portion;
the second resilient portion does not have any bends; and
the first axis, the second axis, and the first direction are perpendicular to each other.
9. The optical element driving mechanism as claimed in claim 8, wherein:
a first surface of the resilient assembly faces the first magnetic element;
the first surface and a second surface of the resilient assembly face opposite directions;
the first protruding surface is between the second surface and the first magnetic element when viewed in a second direction;
the first protruding surface is between a center of the resilient element and a center of the coil in the first direction when viewed in the second direction; and
the first surface faces the coil.
10. The optical element driving mechanism as claimed in claim 9, wherein:
when current with a first frequency is input to the coil, the first fixed end rotates relative to the fixed portion in a first rotational range, and the intermediate connecting portion rotates relative to the fixed portion in a second rotational range; and
a maximum value of the first rotational range is different from a maximum value of the second rotational range.
11. The optical element driving mechanism as claimed in claim 10, wherein:
when current is input to the coil, a phase difference is between movements of the first fixed end and the intermediate connecting portion; and
the phase difference is greater than 90 degrees.
12. The optical element driving mechanism as claimed in claim 11, wherein the fixed portion comprises:
a bottom surface having a planar structure and facing an external device;
a spacing portion between the first magnetic element and the second magnetic element;
a first recess used for accommodating a portion of the first magnetic element;
a second recess used for accommodating the second magnetic element;
a third recess, wherein the first recess is in the third recess;
a fourth recess corresponding to the first resilient portion;
a fifth recess corresponding to the third resilient portion; and
a base surface facing the resilient assembly.

13. The optical element driving mechanism as claimed in claim 12, wherein:
the maximum value of the first rotational range is greater than the maximum value of the second rotational range;
a first magnetic element surface of the first magnetic element is at least partially exposed from the first recess;
at least a portion of the first magnetic permeable element is in the first recess; and
the second magnetic permeable element is not in the first recess.
14. The optical element driving mechanism as claimed in claim 13, wherein:
the second recess is in the third recess;
the fourth recess is in the third recess;
the fifth recess is in the third recess; and
the spacing portion is in the third recess.
15. The optical element driving mechanism as claimed in claim 14, wherein:
a shortest distance between the first magnetic element and the bottom surface is different from a shortest distance between the second magnetic element and the bottom surface; and
a shortest distance between the first magnetic permeable element and the bottom surface is different from a shortest distance between the second magnetic permeable element and the bottom surface.
16. The optical element driving mechanism as claimed in claim 15, wherein:
the shortest distance between the first magnetic element and the bottom surface is less than the shortest distance between the second magnetic element and the bottom surface; and
the shortest distance between the first magnetic permeable element and the bottom surface is greater than the shortest distance between the second magnetic permeable element and the bottom surface.
17. The optical element driving mechanism as claimed in claim 16, wherein:
the first axis is not parallel to the bottom surface;
the first axis is not perpendicular to the bottom surface;
the base surface is not parallel to the bottom surface; and
the base surface is not perpendicular to the bottom surface.
18. The optical element driving mechanism as claimed in claim 17, wherein:
the third recess is formed on the base surface;
the second fixed end is not in mirror symmetrical relative to the first axis when viewed in the first direction;
a distance between a center of the second fixed end and a center of the optical element is greater than 0 when viewed in the first direction;
a shortest distance between the center of the second fixed end and the bottom surface is different from a shortest distance between the center of the optical element and the bottom surface; and
the second fixed portion is U-shaped.

* * * * *